Patented July 28, 1942

2,291,226

UNITED STATES PATENT OFFICE 2,291,226

PRODUCTION OF POLAR ADSORBENTS

Eric Berkeley Higgins, Punchetts, Tewin Wood, England

No Drawing. Application January 18, 1938, Serial No. 185,626. In Great Britain January 22, 1937

20 Claims. (Cl. 252—193)

This invention relates to the production of new products which possess the property of polar adsorption and which consequently can be used in various commercial operations involving polar adsorptions such as the softening of water by the so-called base exchange process or hydrogen ion exchange or both, the dealkalisation of effluents from precipitation water softening plants or the purification of trade effluents or the deacidification or both. The said new products also possess the property of adsorbing relatively large proportions of liquids or condensable gases or both presented either in the liquid or vapour phase whilst still retaining the physical appearance of perfectly dry solids. This latter property renders the products commercially valuable both as substitutes for apolar adsorbents such as charcoal, silica gel and the like in the recovery of vapours from gaseous mixtures or for such bodies as kieselguhr for the retention of liquids mechanically as in the manufacture of dynamite and the preparation of catalysts and as a new form of matter which combines with these latter properties that of the aforementioned polar adsorption. They also form suitable vehicles for the adsorption of horticultural poisons as described in British Patent Specification No. 489,027, dated November 9, 1936.

The invention makes use of what is practically at the present time a waste product, namely the acid sludge obtained from the refining of various mineral oil fractions by means of acid. As mentioned in the book "The Chemical Refining of Petroleum" by Kalichevsky and Stagner, New York, 1933, at pages 92 and 93, the amount of sulphuric acid present in the residual acid sludge varies, depending on the distillate being refined and on the method of refining. The acid sludge at the present time is not only of no value, but is a positive nuisance and causes considerable difficulties and expense in its disposal.

According to the present invention, the new bodies are prepared by the simple application of heat under suitable conditions to a residual acid tar of the petroleum refineries as such or in which the proportion of acid already present is augmented to any suitable amount by the addition of more sulphuric acid. In some cases it is preferred to blend the tar obtained from the lighter fractions from petroleum distillation, which tends to be liquid, with a more solid tar before adding the further sulphuric acid.

In general, the tars obtained from the higher boiling fractions in petroleum distillation require a great deal more additional sulphuric acid before the heating than those obtained by the refining of the lighter fractions owing to the corresponding greater amount of acid in these lighter fractions. As an example, a kerosene refinery acid tar may contain 74 per cent of its weight of acid, whereas that from a lubricating stock may contain 12.0 per cent.

The acid tar is heated under conditions which ensure uniform heating, while stirring is not necessary after the original acid tar has dissolved in the excess acid and formed a uniform mixture. However, it is essential, if the best results are to be obtained, that the temperature should not be allowed to rise above 120° C. before the mixture has become uniform, since otherwise, instead of obtaining the desired gelatinous product, cokey masses are liable to be formed. Such cokey masses, while included within the present invention, do not possess the desired qualities to the same extent as do gels obtained from the same raw material.

It is desirable to provide means for removing any vapours formed which will almost invariably contain some of the petroleum fraction from which the tar was obtained.

The temperature necessary for optimum yield and the time required to complete the reaction varies somewhat with the material employed, but effectively lies between 160° C. and 200° C. The reaction begins at about 150° C., but is apparently not complete below 160° C., even if the heating is continued for a considerable period, while above 200° C. the product tends to break up into extremely fine powder and become soluble or peptisable in water and especially in alkali solutions. When heated much above 200° C. there is a tendency for the formation of carbon. At 160° C., heating for one hour may be regarded as effective, but in general it is found advantageous to continue the heating for two hours whereupon the reaction is substantially complete.

If desired, of course, the acid tar may be mixed with coal dust for example or with inactive mineral material and the new product produced in situ so as to obtain a composite mass which is a useful expedient when preparing the bodies when they are subsequently to be employed in the preparation of catalysts.

The following figures afford specific examples of mixtures used, it being assumed that with each material the heating is carried out for two hours at 160° C.:

1 part by weight of mid-continental (Lobitos) kerosene sludge is treated with 2 parts of sulphuric acid.

1 part of mid-continental cylinder sludge is treated with 20 parts of sulphuric acid.

1 part of Pennsylvania solid sludge is treated with 20 parts of sulphuric acid.

1 part of Iraq white spirit sludge is treated with 2 parts of sulphuric acid.

1 part of Iraq lubricating oil sludge is treated with 40 parts of sulphuric acid.

The progress of the reaction is indicated by evolution of sulphur dioxide and its completion by the evolution ceasing or virtually ceasing. The time of heating should not be unnecessarily prolonged since in these circumstances, the gel formed by the reaction tends to break up into small particles and the ultimate product may then be too finely divided for many uses. The reaction may, however, be carried out successfully and completely while the gel is formed as a mass. The actual amount of acid necessary for any particular acid tar which it is proposed to use may easily be found by trial on small samples; the correct amount is that which forms a dry, coherent mass of jelly after the reaction has taken place. If a liquid product is obtained, this shows that too much acid has been added, but on the other hand, a cokey mass shows that the quantity of sulphuric acid added is too small. Too much acid yields a product very finely divided and more or less soluble or peptisable in water, especially in alkali solutions. In general, a liquid acid tar as indicated by the above examples, will require twice its own weight of sulphuric acid, while a solid acid tar requires between twenty to forty times its own weight of sulphuric acid. In general, the weight of sulphur dioxide evolved during the reaction is equivalent in weight to the finished product after drying. Clearly, the sulphur dioxide given off may be used for the preparation of sulphuric acid and sulphites.

The majority of the acid present may be washed out of the product and by the use of counter-current washing it may be obtained in the form of sulphuric acid of between 42 and 83 per cent strength, which after concentration, is suitable for use again in the process. Thus, after the heat treatment, the mass is allowed to cool, and is then washed in this way with water to eliminate the free acid. The product thus obtained is in the form of black, gelatinous lumps, neutral in reaction, but possessing the power of hydrogen ion exchange in a high degree, and can be used for that purpose, being regenerated with acid in the usual way. In this state it is also suitable for use in the dealkalisation of liquors since it acts as an insoluble acid. The gel form of the body has but small mechanical strength and it is preferable to dehydrate the gel before use which is readily accomplished by simple drying which is best carried out in a current of hot air at temperatures not above 110° C. Great shrinkage in volume takes place in the drying and the final product has sufficient mechanical strength while retaining the above-mentioned properties of the gel. The product forms hard black nodules which are entirely resistant and insoluble in water, acids or alkali solutions whether cold or boiling. They are also unaffected by the usual organic solvents and possess the property of adsorbing gases and vapours apolarly.

The primary product can be readily converted into the sodium or calcium derivative or "salt." In order to produce such a derivative, all that is necessary is to cause the mass to come into contact with a solution containing slightly more than the stoichiometrically necessary amount of a feeble alkali, bicarbonate of soda for example, to allow the reaction to be completed and subsequently to wash and dry the product.

The necessary amount of alkali can be estimated by direct titration. Strong alkalis such as lime or caustic soda may be used to produce the neutral salt but owing to the avidity with which the neutral product adsorbs hydroxyl ions, it is difficult thus to obtain a neutrally-reacting product which is necessary, for example, to enable it to be used in water softening by base exchange. Of course, the salt complex may be prepared either direct from the dehydrated primary product or may be produced from the gel-like primary product and then employed as such or dehydrated after such treatment, for example, by drying at 100–110° C.

Some examples of the process according to the invention will now be described in somewhat greater detail.

*Example 1*

100 kilogrammes of mid-continent kerosene sludge containing 74 per cent of sulphuric acid are thoroughly mixed with 200 kilogrammes of concentrated sulphuric acid was carefully heated up to 160° C. under conditions which ensure uniform heating. The mass is kept at this temperature for two hours. The reaction product is then allowed to cool, and when cool, washed thoroughly with water until the last effluents of wash water are substantially free from sulphuric acid. Water containing an excess of sodium bicarbonate, actually 3 kilogrammes, is now added to the mass and the whole allowed to stand overnight.

The mass is then washed with water until the effluent is free from sodium salts, and is then dried at 100° C. to yield the finished product, of which there is 8.3 kilogrammes. It has a mass density of 0.319 in water, or in the form of a filter bed amounts to 19.8 lbs. for every cubic foot occupied, the absolute density of the particles being, of course, greater than unity, and a base exchange of 7.7 expressed as a percentage of lime. It thus gives a softening capacity equivalent to a removal of 19,126 grains of calcium carbonate per cubic foot of the filter bed.

*Example 2*

100 kilogrammes of Iraq white spirit sludge containing 68 per cent of sulphuric acid are thoroughly mixed with 200 kilogrammes of concentrated sulphuric acid and, as in Example 1, carefully heated up to 160° C. and kept at that temperature for two hours. The reaction product is allowed to cool and thoroughly washed with water as before. The product is now dried at 100 to 110° C. and forms a hard granular mass suitable for hydrogen ion exchange. It has a mass density of 0.392 in water and tested against calcium bicarbonate solution, a base-exchange value of 7.6 per cent dry weight reckoned as CaO.

After exhaustion, it can be regenerated with acids.

Yet again, water containing an excess of sodium bicarbonate, in this instance amounting to 5 kilogrammes, may be added to the washed mass of the reaction product and left to stand overnight. It is then washed with water until the effluent is free from sodium bicarbonate and the finished product is obtained as before by drying at 100° C. In this case, 50 kilogrammes of the dried product are obtained. It has a mass density of 0.392 in water, and a base exchange value of 7.6 per cent dry weight reckoned as CaO. Thus it gives a softening capacity equivalent to 23,128 grains of calcium carbonate per cubic foot of filter bed.

*Example 3*

100 kilogrammes of Pennsylvania solid sludge containing 12 per cent of sulphuric acid are added to 4,000 kilogrammes of concentrated sulphuric acid and slowly heated to 120° C. with stirring until the solid sludge has dissolved in the acid to form a homogeneous mixture. This mixture is then allowed to heat up to 160° C. uniformly and kept at this temperature for two hours. After cooling it is thoroughly washed with water, as before, and water containing an excess of sodium bicarbonate amounting to 30 kilogrammes in this case is added to the mass and is then allowed to stand overnight. It is then washed until the effluent shows no traces of sodium bicarbonate, and dried at 100° C. to yield 85 kilogrammes of the dried product. This has a mass density of 0.392 in water and a base exchange of 7.34 parts of lime per 100 parts of the material. Thus it has a softening capacity equivalent to 22,428 grains of calcium carbonate per cubic foot of the bed.

It has already been mentioned that the new products adsorb acids and alkalis so that they may be used for removing alkali or acid from solutions either direct or following upon previous opposite treatment.

It is obvious that the new products are admirably suitable for the base exchange purification of water in a manner precisely as zeolites are now used, and as indicated in the above examples.

Again, in the precipitation methods of softening hard water, it is well known that if an excess of lime is employed, a water free or substantially free from carbonates and largely free from magnesium compounds may be obtained from which the precipitate settles with great ease and rapidity; the treated effluent, however, still contains free caustic lime and may contain magnesium hydrate. If such an effluent be passed through a bed of the new product obtained according to the present invention, the caustic lime and magnesia is removed bodily and an effluent results which is neutral, and substantially free from lime, from magnesia and carbonates.

As the adsorption of alkalis is largely independent of the nature of the previously adsorbed base (cation), it is clear that for this latter purpose in conjunction with precipitation softening, the lime complex—such as is produced by the "exhaustion" of the new material in base exchange softening, is here serviceable.

It is also clear that if the operation of softening by precipitation be only partial, for example, directed to the removal of temporary hardness only, and the effluent water is passed through a bed of the new material prepared according to the present invention, the calcium complex will free it from excess alkali and thus render it suitable for base exchange softening by the agency of the sodium complex or, of course, in the known manner, with zeolites.

At the other extreme, if the adsorbents prepared according to the present invention be treated with acids in excess, the cation already adsorbed may be replaced by hydrogen ion and the acid product, being insoluble in water, may be freed of the excess of acid and then employed for polar adsorption reactions where exchange occurs between base and hydrogen ion, but as already mentioned, the percentage exchange in such conditions is less than that stoichiometrically equivalent to that in neutral solution.

The bodies obtained according to this invention, on account of their base exchange and adsorptive properties, may be used as such for the improvement and fertilisation of the soil and may, before employment for such purpose, the result of which is permanent, be treated with ammonium or potash solutions, thus serving as a means of introducing these soluble plant foods in a form proof against loss by drainage. They will naturally in course of time have their adsorbed food-stuff supply exhausted by the growing crops, but they retain their power of fixing new supplies of such foodstuffs and thus contribute permanently to the good heart of the soil so treated.

I claim:

1. A process of making carbonaceous cation exchange material which comprises mixing a weight of petroleum acid sludge with several times that weight of an added quantity of concentrated sulphuric acid, heating the mixture in a uniform state to such a temperature within the range of 100°–200° C. and for such a time that a solid cation exchange material forms, and washing the material.

2. A process of making a carbonaceous cation exchange material which comprises adding to a weight of petroleum acid sludge an amount of sulphuric acid which is equivalent to several times said weight of concentrated sulphuric acid, heating the mixture of acid sludge and acid to such a temperature within the range of 100°–200° C. and for such a time that a solid cation exchange material forms, and washing the resulting material.

3. A process of making a carbonaceous cation exchange material which comprises adding to a weight of petroleum acid sludge several times that weight of a quantity of concentrated sulphuric acid, stirring the sludge and acid to a uniform state while heating the mixture to such a temperature within the range of 100°–200° C. and for such a time that a solid cation exchange material forms, and washing the resulting material.

4. The process of making a carbonaceous cation exchange material which comprises mixing a weight of petroleum acid sludge with several times that weight of an added quantity of concentrated sulphuric acid while heating to a temperature up to 120° C. until a uniform mixture is formed, and subsequently heating said mixture above 150° C. until a solid cation exchange material forms, and washing the resulting material.

5. The method of making a carbonaceous cation exchange material which comprises mixing a weight of petroleum acid sludge with several times that weight of an added quantity of concentrated sulphuric acid while heating the mixture at a temperature up to 120° C. until a uniform mixture is obtained, subsequently heating said mixture to a temperature between 160° and 200° C. until a solid cation exchange material forms, and washing the resulting material.

6. The method of making a product possessing property of polar adsorption which comprises heating acid sludge from the refining of mineral oil fractions at a temperature up to 120° C. with stirring until a uniform mixture is formed, and subsequently heating said mixture above 150° C. until the product sets to a gelatinous mass.

7. The method of making a product possessing the property of polar adsorption which comprises heating acid sludge from the refining of mineral oil fractions at a temperature up to 120° C. while stirring until a uniform mixture is formed, and subsequently heating said mixture to a temperature between 160° and 200° C. until the product sets to a gelatinous mass.

8. The method of making a product possessing the property of polar adsorption which comprises adding sulphuric acid to acid sludge from the refining of mineral oil fractions, heating said materials at a temperature up to 120° C. with stirring until a uniform mixture is formed, and subsequently heating said mixture above 150° C. until the product sets to a gelatinous mass.

9. The method of making a product possessing the property of polar adsorption which comprises adding to an acid sludge from the refining of mineral oil fractions another acid sludge containing a higher proportion of acid, heating said materials to a temperature up to 120° C. with stirring until a uniform mixture is formed, and subsequently heating said mixture above 150° C. until the product sets to a gelatinous mass.

10. The method of making a product possessing the property of polar adsorption which comprises heating acid sludge from the refining of mineral oil fractions at a temperature up to 120° C. with stirring until a uniform mixture is formed, subsequently heating said mixture above 150° C. until the product sets to a gelatinous mass, and removing free acid from said mass by washing.

11. The method of making a product possessing the property of polar adsorption which comprises heating acid sludge from the refining of mineral oil fractions at a temperature up to 120° C. with stirring until a uniform mixture is formed, subsequently heating said mixture above 150° C. until the product sets to a gelatinous mass, washing said mass with water, and dehydrating the said mass by drying to form a stable product.

12. The method of making a product possessing the property of polar adsorption which comprises heating acid sludge from the refining of mineral oil fractions at a temperature up to 120° C. while stirring until a uniform mixture is formed, subsequently heating said mixture to a temperature between 160° and 200° C. until the product sets to a gelatinous mass, washing said mass with water, and dehydrating the said mass by drying to form a stable product.

13. As a new composition of matter, the product of the method set forth in claim 1.

14. As a new composition of matter, the product of the method set forth in claim 3.

15. As a new composition of matter, the product of the method set forth in claim 4.

16. A process of making a cation-exchange substance comprising the steps of adding to a weight of a mixture of acid sludges, resulting from acid treatment of different petroleum components, several times that weight of a quantity of sulphuric acid, and heating a uniform mixture of the added acid with said mixture of acid sludges to temperature, within the range of 100°–200° C., conducive to and until formation of a cation-exchange material.

17. A process of making a cation-exchange substance comprising the steps of adding to a weight of a mixture of acid sludges, resulting from acid treatment of different petroleum components, several times that weight of a quantity of concentrated sulphuric acid, and heating a uniform mixture of the acid with said mixture of acid sludges to temperature, within the range of 100°–200° C., conducive to and until formation of a cation-exchange material.

18. A composition of matter formed by heating acid sludge in uniform mixture with several times its weight of added concentrated sulphuric acid to a temperature, within the range of 100°–200° C., conducive to and until formation of material having the property of cation-exchange.

19. A cation-exchange substance, granular in structure and having per cubic foot in terms of calcium carbonate a base-exchange capacity of at least 7000 grains, comprising a washed product of treatment of acid sludge with several times its weight of added concentrated sulphuric acid at such a temperature within the range of 100°–200° C. and for such a time that cation-exchange material is formed.

20. A composition of matter formed by heating a mixture of a plurality of acid sludges, resulting from acid treatment of different petroleum components, with concentrated sulphuric acid of several times the weight of said mixture to a temperature, within the range of 100°–200° C., conducive to and until formation of material having the property of cation-exchange.

ERIC BERKELEY HIGGINS.